UNITED STATES PATENT OFFICE.

IGNAZ KREIDL, OF VIENNA, AUSTRIA-HUNGARY.

WHITE ENAMEL AND THE LIKE.

1,129,300.        Specification of Letters Patent.     Patented Feb. 23, 1915.

No Drawing.     Application filed September 20, 1912. Serial No. 721,349.

*To all whom it may concern:*

Be it known that I, Dr. IGNAZ KREIDL, partner of the firm Vereinigte chemische Fabriken, Landau, Kreidl, Heller & Co., of Sebastian-Kohlgasse 5–9, Vienna, XXI, a subject of the Emperor of Austria-Hungary, residing at Sebastian-Kohlgasse 5–9, Vienna, XXI, in the Empire of Austria-Hungary, have invented new and useful Improvements in White Enamel and the like, of which the following is a specification.

This invention relates to white enamel and the like.

There is described in my United States Patent No. 1,101,455, issued June 23, 1914, a process the main feature of which is that the clouding agent used consists in hydrates of metal compounds suitable for clouding purposes, which hydrates contain a small quantity of alkali. I have now discovered that these clouding agents possess great covering power even when not in hydrated form, if they contain alkali.

In producing the enamel of the present invention, the alkali is only partially removed in the manufacture of the clouding agent, for example from the zirconates or compounds of zirconium containing silicic acid which have been obtained by complete or partial separation of silica from zircon by means of alkaline agents. The composition consequently contains a smaller proportion of alkali than is contained in a molecular combination of the elements. The mass thus obtained is then heated to render it anhydrous.

For the removal of the combined alkali from the alkaline zirconium compounds it is preferable to use solutions of salts. In addition to ammonia salts, which are easily removed after the reaction not only by washing but also by heating, metal salts are very suitable. After the reaction and ensuing washing of the alkali salts and of the excess metal salt, the latter remains in the form of metal hydrate or oxid. The most suitable salts are those in which the hydrates or oxids already possess clouding properties, for example tin and aluminium.

In the carrying out of the process the reaction mass obtained for example by the partial or complete separation of silica from zircon by means of alkaline reagents such as carbonates or hydrates of soda, is washed with water to remove the soluble silicates and the excess of alkali. To partially remove the combined alkali the reaction mass is treated with a soluble salt such as aluminium sulfate. The residue is then washed and rendered anhydrous by heating.

The enamel is prepared in known manner. The enamel mass is melted and ground. The clouding agent is added to the already melted and ground mass.

What I claim is:

1. A white enamel containing as a clouding agent an anhydrous metal composition suitable for clouding purposes in combination with a small quantity of alkali, said quantity of alkali being less than the proportion thereof in a molecular combination of the elements.

2. A white enamel containing as a clouding agent an anhydrous metal composition suitable for clouding purposes in combination with alkali, the composition being poor in alkali, said quantity of alkali being less than the proportion thereof in a molecular combination of the elements.

3. A white enamel containing as a clouding agent an anhydrous alkali-containing zirconium composition poor in alkali, said quantity of alkali being less than the proportion thereof in a molecular combination of the elements.

4. A white enamel containing as a clouding agent a metal oxid suitable for clouding purposes in combination with a small quantity of alkali, said quantity of alkali being less than the proportion thereof in a molecular combination of the elements.

5. A white enamel containing as a clouding agent zirconium-oxid in combination with a small quantity of alkali, said quantity of alkali being less than the proportion thereof in a molecular combination of the elements.

6. A white enamel containing as a clouding agent a silica-containing metal compound suitable for clouding purposes in combination with a small quantity of alkali, said quantity of alkali being less than the proportion thereof in a molecular combination of the elements.

7. A white enamel containing as a clouding agent a silica-containing zirconium compound in combination with a small quantity of alkali, said quantity of alkali being less than the proportion thereof in a molecular combination of the elements.

In testimony whereof I have signed my name to this specification in the presence of two subscribing witnesses.

Dr. IGNAZ KREIDL.

Witnesses:
 Hugo Keik,
 August Fugger.